(12) United States Patent
Petruzziello

(10) Patent No.: US 9,373,271 B2
(45) Date of Patent: Jun. 21, 2016

(54) MAGNETIC DEFIBRILLATOR TRAINING PAD

(71) Applicant: Cristine Petruzziello, Nahant, MA (US)

(72) Inventor: Cristine Petruzziello, Nahant, MA (US)

( * ) Notice: Subject to any disclaimer, the term of this patent is extended or adjusted under 35 U.S.C. 154(b) by 76 days.

(21) Appl. No.: 14/271,558

(22) Filed: May 7, 2014

(65) Prior Publication Data

US 2015/0325150 A1 Nov. 12, 2015

(51) Int. Cl.
*G09B 23/28* (2006.01)
*G09B 23/30* (2006.01)

(52) U.S. Cl.
CPC .............. *G09B 23/30* (2013.01); *G09B 23/288* (2013.01)

(58) Field of Classification Search
CPC ........ G09B 23/28; G09B 23/288; A61N 1/39; A61N 1/00
USPC ........................................... 434/262, 265, 267
See application file for complete search history.

(56) References Cited

U.S. PATENT DOCUMENTS

| 3,520,071 | A | | 7/1970 | Abrahamson et al. | |
|---|---|---|---|---|---|
| 5,137,458 | A | * | 8/1992 | Ungs | G09B 23/288 434/262 |
| 5,993,219 | A | * | 11/1999 | Bishay | A61N 1/046 434/265 |
| 6,074,214 | A | * | 6/2000 | Browne-Wilkinson | G09B 23/34 434/262 |
| 6,638,073 | B1 | | 10/2003 | Kazimirov et al. | |
| 6,969,259 | B2 | | 11/2005 | Pastrick et al. | |
| 2003/0036044 | A1 | * | 2/2003 | Pastrick | G09B 23/288 434/265 |
| 2011/0287398 | A1 | | 11/2011 | Blackburn | |
| 2012/0329022 | A1 | | 12/2012 | Hetland et al. | |
| 2014/0004494 | A1 | | 1/2014 | Griesser et al. | |
| 2014/0099618 | A1 | * | 4/2014 | Yang | G09B 23/288 434/265 |
| 2014/0315173 | A1 | * | 10/2014 | Duval-Arnould | G09B 23/28 434/262 |

FOREIGN PATENT DOCUMENTS

| CA | 2058776 A1 | 7/1992 |
|---|---|---|
| WO | 9705591 A1 | 2/1997 |
| WO | 2012047504 A1 | 4/2012 |
| WO | 2014005137 A1 | 1/2014 |

* cited by examiner

*Primary Examiner* — Xuan Thai
*Assistant Examiner* — Kristen Shirley
(74) *Attorney, Agent, or Firm* — Lambert & Associates; Gary E. Lambert; David J. Connaughton, Jr.

(57) ABSTRACT

A defibrillator training system having a magnetic training pad connectable to a torso dummy is provided. The magnetic connection between the training pad and the torso dummy allows the defibrillator training pads to be re-used by being magnetically attached and detached to and from the torso dummy without requiring replacement pads.

20 Claims, 3 Drawing Sheets

MAGNETIC DEFIBRILLATOR TRAINING PAD

BACKGROUND OF THE INVENTION

1. Field of the Invention

The present invention relates generally to defibrillator training. More particularly the present invention relates to a magnetic defibrillator training pad receivable on a training dummy.

2. Description of Related Art

Defibrillator training is provided to a wide variety of people in many different employment fields, certifications, and training programs. It is a vital requirement for all emergency medical personnel, first responders, police, hospital workers, and the like. Moreover, many teachers, personal trainers, and other certified workers require training on defibrillator use.

Typically, defibrillator training is performed in group classes, allowing multiple people to be trained simultaneously. Part of this class is hands on practice of the placement and operation of the defibrillator pads on a training dummy. Proper defibrillator pad placement is very important to ensure that the electrical charges are delivered in a proper manner to best trigger heart contractions. Each class member may take a turn practicing placement of the defibrillator training pad on a training dummy.

Traditional defibrillator training pads comprise a sticky adhesive that allows them to be placed on the dummy and held in place. However, the adhesive is quickly fouled after a couple uses because it attracts lint, dirt, dust, and other particles which stick to the adhesive, rendering it useless. As such, when multiple class members are training on a defibrillator, at best the adhesive defibrillator training pads can be used and re-used a few times, and then must be discarded for a new one. Often multiple training pads must be used for each training class.

Therefore, what is needed is a defibrillator training system that allows the pads to be placed in the proper place on a training dummy without falling off, that can also be re-used repeatedly during a training and for later trainings.

SUMMARY OF THE INVENTION

The subject matter of this application may involve, in some cases, interrelated products, alternative solutions to a particular problem, and/or a plurality of different uses of a single system or article.

In one aspect, a defibrillator training system is provided. The system comprises a pair of magnetic training pads, and a magnetic training torso. The training pads comprise a body with a magnet, and a wire extending from the body. These pads are attachable and detachable from a magnetic training torso dummy. In use, a trainee practices placing the pads on the dummy and operation of a defibrillator. The pads may then be removed from the dummy, and then re-used.

In another aspect, the training pads of the system may comprise a magnetic metal, and a magnet is positioned on a portion of the torso dummy in an area where each pad should be connected.

In yet another aspect, magnets may be on both the training pads as well as areas of the torso dummy in the places where each pad should be connected.

DETAILED DESCRIPTION

Figure 1:
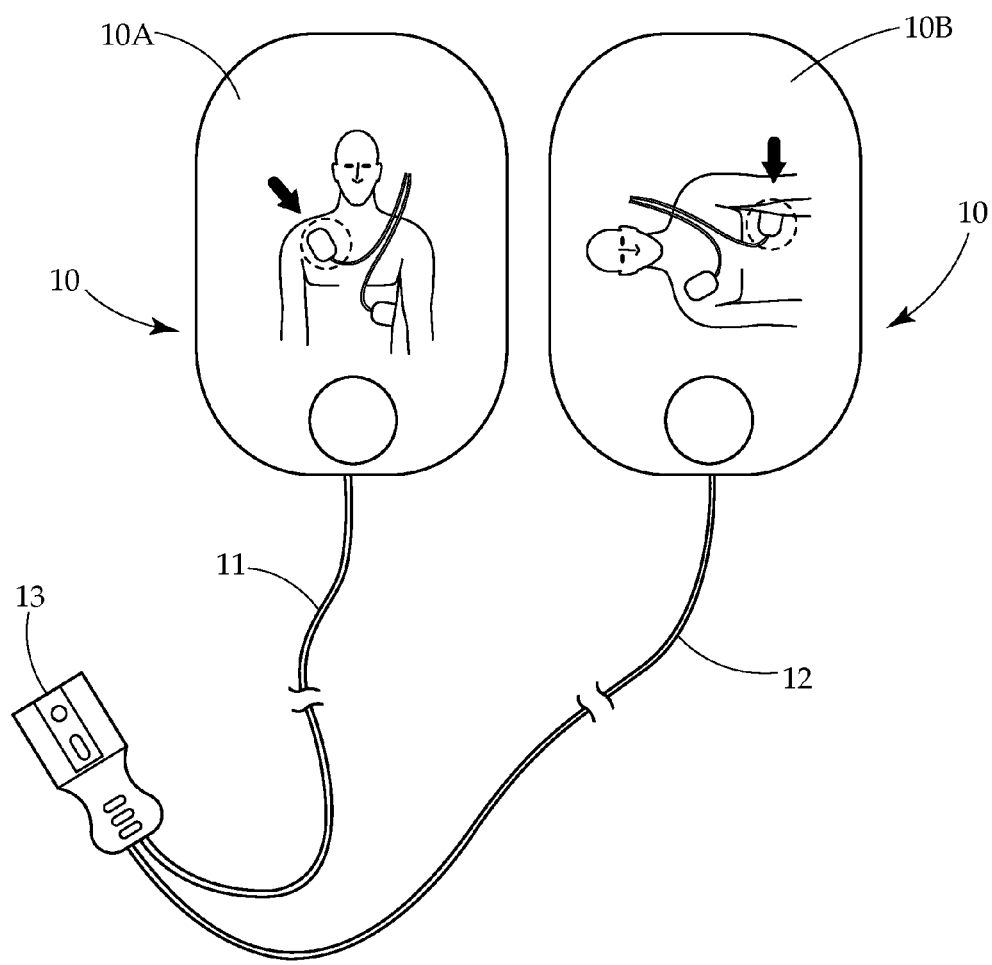
FIG. 1 provides a view of an embodiment of the defibrillator training pads.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a magnetic defibrillator training pad or set of pads configured for placement on a magnetic training dummy. During the training of users of a defibrillator device, training pads are used that are not configured to deliver an electrical charge. These pads allow users to practice proper placement on a dummy torso.

The present invention comprises a magnetic training pad. This pad is configured to be magnetically attached, removed, and re-attached repeatedly to a training dummy. This magnetic attachment may involve either two magnets, or one magnet and a magnetic material such as metal. The magnet or magnets may be in either the pad, the torso, or both. In one embodiment, the training dummy may have some sort of magnetic material allowing the magnetic training pad to be attached thereto. In another embodiment, a magnet or magnets may be embedded into the dummy, and the training pad may have a magnetic material attracting it to the magnet of the dummy.

In one embodiment, the training pad may comprise a flexible magnetic sheet formed into a size and shape resembling actual defibrillator pads for use. A wire extends from the training pad and terminates in a connector allowing connection to a training defibrillator controller. It should be understood that the training pad cannot be used to deliver a charge that would be delivered using an actual defibrillator. Instead, the pad is configured for training purposes only, and specifically, configured for the repeated attachment and detachment to and from the training dummy.

The present invention may further comprise a magnetic training dummy. The training dummy contemplated herein is configured to have the magnetic training pad attached to it in two specific locations that a real defibrillator pad would be attached. These are traditionally a user's left side torso and right upper chest, however any orientation may be used depending on defibrillator configuration.

The magnetic training dummy torso may have magnets or magnetic material either integrated into it, or integrated into a removable "skin" which covers the dummy body. In many known training dummy torso embodiments, the dummy has two parts—a base, and a removable skin. Thus, in one embodiment, an existing dummy may be retrofitted to work with the magnetic training pads by attaching a removable skin having the magnetic material or magnet therein. This embodiment would allow an existing dummy to be used with only a minor upgrade. In another embodiment, a dummy torso may have a magnet or magnetic material in the base, and may have a removable skin that may or may not be magnetic. As such, it should be understood that in some embodiments of training dummy torsos having a base and a removable skin, that the magnet or magnetic material may be in either the base, the skin, or both.

The magnet may be any type of magnet capable of magnetic attachment to another magnet or a magnetic metal. Examples of which the magnet may be made include, but are not limited to permanent magnets such as Neodymium Iron Boron (NdFeB or NIB), Samarium Cobalt (SmCo), Alnico, Ceramic or Ferrite magnets; electromagnets; temporary magnets, and the like.

The training dummy may be able to receive the magnetic training pad magnetically in any manner. In one embodiment, a ring of magnets or a single magnet ring may define the attachment areas. This ring may be visible on the dummy, or covered and invisible to a user. In another embodiment, a ring of metallic metal may define the attachment area. Similarly, the ring of metal may be visible or not visible to the user. Further, the dummy may have a sheet of magnetic material (magnet, or magnetic metal) over its surface, either the entire surface, or part of the surface. However, as noted before, the magnetic training pad may be received in any manner, not just specifically the above noted examples.

Typically, the defibrillator training pads will be provided as a pair of two training pads. However, it should be understood that the invention contemplated herein does not require that there be two training pads. A single pad or many pads may also be considered as within the scope of the present invention.

Turning now to FIG. 1 a frontal view of the training pads are provided. The pads 10 are roughly rectangular with rounded edges, though it should be understood that their shape may vary depending on embodiment. These pads are thin, generally less than one inch in thickness. In many embodiments the pads are flexible enough to contour to a torso of a training dummy (not shown). Pads 10 may be made of any material capable of manipulation and of being attached and detatched from the training dummy, so long as there is at least a portion of the pad 10 that comprises either a magnet, a magnetic metal or other magnetic material. In FIG. 1, top surfaces 10A and 10B of the pads 10 are shown. A marking on each pad indicates where on the dummy the pad should be placed. In operation, it is important that the appropriate pad be placed in the right location on the body/torso. Therefore, proper placement of the training pads on the training torso should be encouraged by the system to facilitate training. This encouragement may be done by markings indicating proper location, or other design and configuration guiding the pad to its correct area. Wires 11, 12 extend from the two pads. These wires terminate in a connector 13. Connector may be attached to a defibrillator test pack (not shown) for further training.

Figure 2:
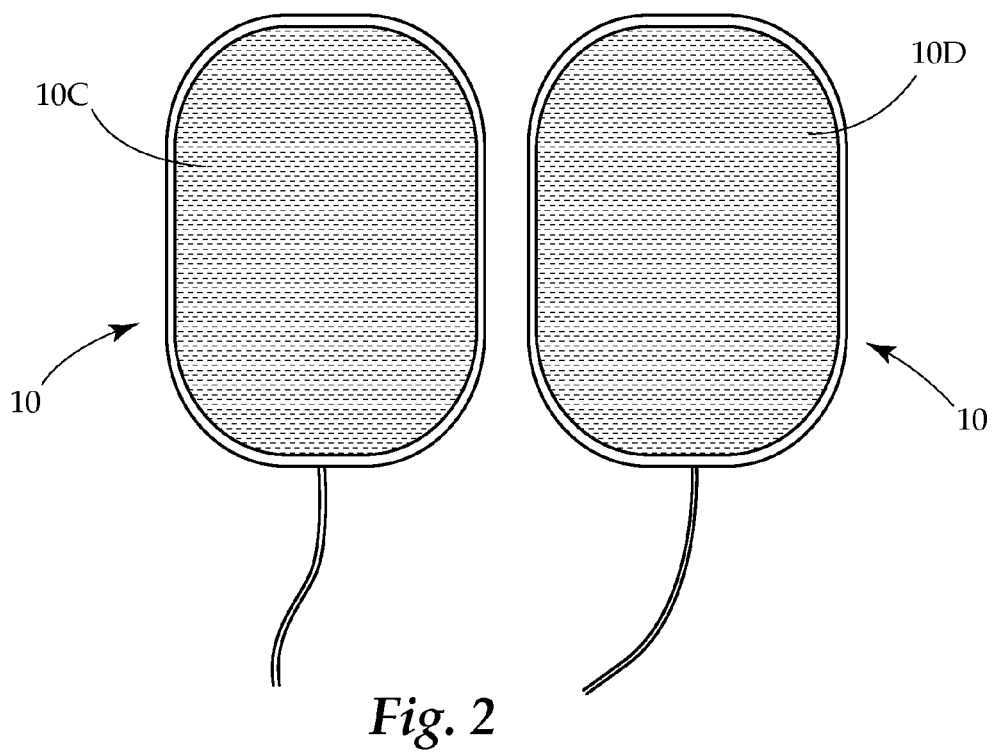
FIG. 2 provides a view of another embodiment of the defibrillator training pads.

FIG. 2 shows another view of an embodiment of the defibrillator training pad 10. In this view, a bottom surface of the training pads 10 are shown. Lower surfaces 10C and 10D are shown in this embodiment as a thin layer of flexible magnet material. In other embodiments, the lower surfaces 10C and 10D may be a magnetic metal. In still other embodiments, a magnet or magnetic metal may make up a small cross section of the lower surfaces 10C, 10D. The magnet or magnetic metal allows the training pads 10 to be repeatedly and removably attached to a training torso (not shown) without fouling, or losing their connective ability over time or use. It should be understood that the magnet need not be on the bottom surface 10C, 10D. Indeed, because of the nature of magnetic forces, the magnet or magnetic metal may be covered by another material, depending on embodiment and desired appearance of the training pad.

Figure 3:
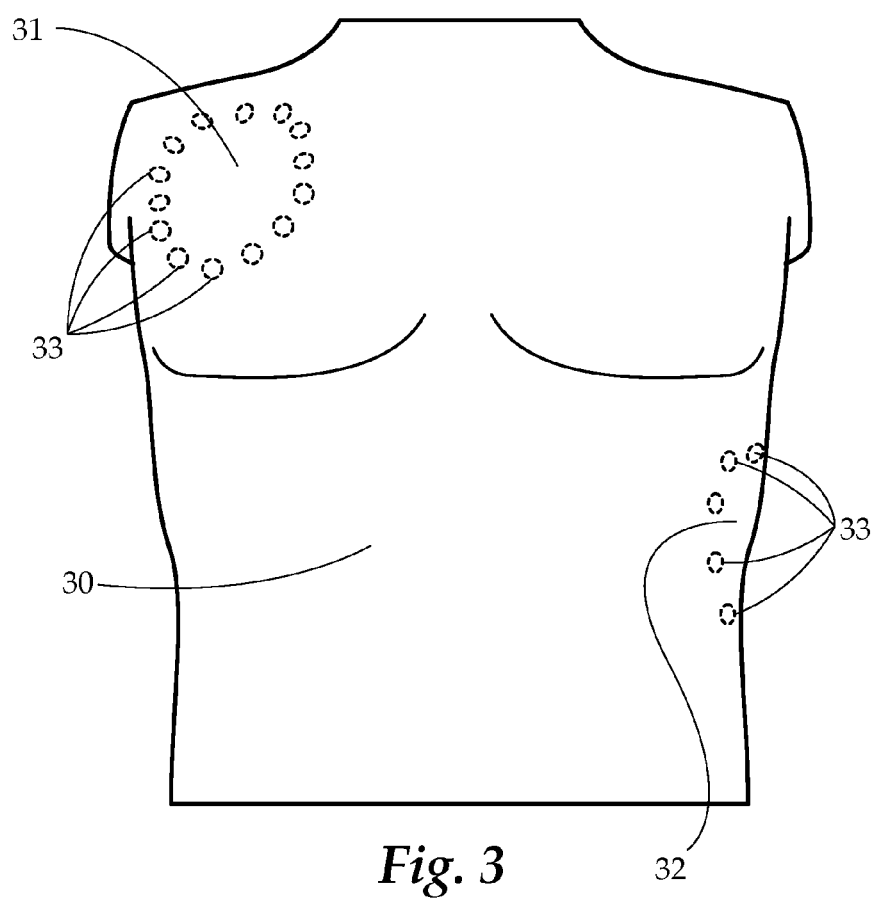
FIG. 3 provides a view of an embodiment of the defibrillator training torso dummy.

FIG. 3 provides a view of an embodiment of the torso of the present invention. The dummy torso 30 is configured to be shaped similarly to an upper torso of a person. In a particular embodiment, the torso 30 should provide at least the left side chest and right upper chest where the pair of training pads (not shown) can be placed. In the embodiment shown, a plurality of small magnets 33 are formed in a ring to define the upper placement region 31 and lower placement region 32. These regions 31, 32 are sized approximately to match the training pads. The magnets 33 may be formed to be just inside a perimeter of the pads, or may be slightly smaller. As noted previously, the placement regions 31, 32 may be configured in any way to allow magnetic connection of the pads (not shown) to the torso. As such, placement regions may be defined by a ring of metal or magnet, a plurality of small magnets defining the region (as shown) a plurality of magnetic metal pieces, or a sheet of magnet or magnetic metal just to list a few. The placement regions 31, 32 may be visible to a user, or they may be concealed from the user.

Figure 4:
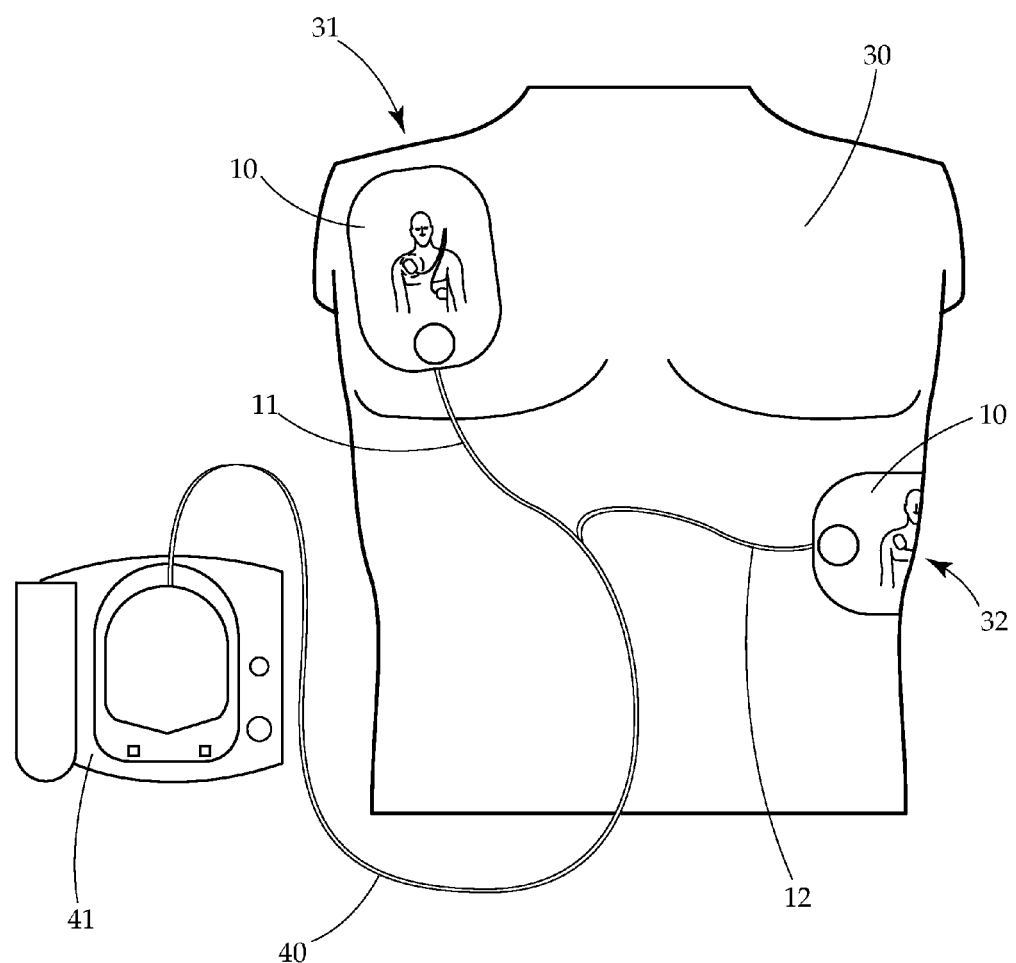
FIG. 4 provides a view of an embodiment of the defibrillator training system.

FIG. 4 provides a view of an embodiment of the torso with the defibrillator training pads magnetically connected. The torso 30 defines connection regions 31, 32, which are covered by the defibrillator training pads 10 on the right upper chest and left side of the torso 30. Wires 11, 12 extend from the two training pads 10, connecting to a combination wire 40, which connects to a defibrillator training unit 41. The magnetic connection between training torso 30 and training pads 10 and the connection regions 31 and 32 may be achieved by any magnet-magnet, or magnet-magnetic metal connection between the torso and pad.

The magnetic training pad and torso may be used in a system to facilitate defibrillator training. The training pad and torso may be used in any manner. In one embodiment, the training may involve a user/trainee obtaining the magnetic torso and the magnetic training pads. The user may then place the pads in the appropriate places on the torso. The magnetic connection between the training pad or pads and the torso will hold them in place. The training may then proceed to operation of the training defibrillator. The pads may then be removed, and used for the next user, and so on. Further once a training session with multiple users has concluded, the pads may be stored and used for a later training session with multiple users. The training pads and magnetic training torso may be used and reused nearly indefinitely because the magnetic connections between the pads and torso are not depleted with use and re-use.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A defibrillator training system comprising: a pair of magnetic defibrillator training pads, each comprising a body with a magnet, and a wire extending from the body; a training torso formed as at least a part of a human torso, the training torso having a base, and a skin layer removably attached to the base, the skin layer formed as a continuous surface shaped similarly to a chest and abdomen area of the torso, and covering the base; and wherein the skin layer comprises a first region of magnetic metal, and a second region of magnetic metal, each of the first and second regions of magnetic metal having one of the pair of magnetic training pads magnetically connected.

2. The defibrillator training system of claim 1 further comprising a defibrillator training unit, the defibrillator training unit connected to the pair of magnetic defibrillator training pads by the wire of each pad.

3. The defibrillator training system of claim 1 wherein the magnet is a flexible magnetic sheet.

4. The defibrillator training system of claim 1 wherein the magnet is a ring about a perimeter of each of the pair of magnetic training pads.

5. The defibrillator training system of claim 1 wherein the pair of magnetic training pads is each magnetically connected by a magnetic attraction between the one of the pair of training pads and one of the first and second region of magnetic metal of the skin layer, the skin layer being beneath an entirety of both of the training pads when magnetically connected.

6. The defibrillator training system of claim 1 further comprising a first marking outline about a perimeter of the first region of magnetic metal, and a second marking outline about a perimeter of the second region of magnetic metal.

7. A defibrillator training system comprising: a pair of magnetic defibrillator training pads, each of the pair comprising a body having a magnetic metal, and a wire extending from the body; a magnetic training torso formed as at least a part of a human torso, the training torso having a base, and a skin layer removably attached to the base, formed as a continuous surface shaped similarly to a chest and abdomen area of the torso, and the skin layer covering the base; and a first region comprising a magnet, and a second region comprising a magnet, each of the first and second regions having one of the pair of magnetic training pads magnetically connected.

8. The defibrillator training system of claim 7 further comprising a defibrillator training unit, the defibrillator training unit connected to the pair of magnetic defibrillator training pads by the wire of each pad.

9. The defibrillator training system of claim 7 wherein at least one of the magnet of the first region and the magnet of the second region is a magnetic sheet.

10. The defibrillator training system of claim 7 wherein each magnet is a ring about a perimeter of each of the first and second regions of the torso.

11. The defibrillator training system of claim 7 wherein each magnet is a single magnetic piece.

12. The defibrillator training system of claim 7 further comprising a marking outline about a perimeter of the first region, and a marking outline about a perimeter of the second region.

13. The defibrillator training system of claim 7 wherein the magnet of each of the first and second regions are visible to a user.

14. The defibrillator training system of claim 7 wherein the magnet of each of the first and second regions are hidden from a user.

15. A defibrillator training system comprising: a pair of magnetic defibrillator training pads, each of the pair comprising a body having a magnet, and a wire extending from the body; a magnetic training torso formed as at least a part of a human torso, the training torso having a base, and a skin layer removably attached to the base, formed as a continuous surface shaped similarly to a chest and abdomen area of the torso, and the skin layer covering the base; and wherein the skin layer comprises a first region comprising a magnet, and a second region comprising a magnet, each of the first and second regions having one of the pair of magnetic training pads magnetically connected.

16. The defibrillator training system of claim 15 further comprising a defibrillator training unit, the defibrillator training unit connected to the pair of magnetic defibrillator training pads by the wire of each pad.

17. The defibrillator training system of claim 15 wherein the magnet of each of the pair of training pads is a flexible magnetic sheet.

18. The defibrillator training system of claim 15 wherein the magnet of the first region and the magnet of the second region is formed as a ring about a perimeter of each of the first and second regions of the torso.

19. The defibrillator training system of claim 15 wherein the magnet of the first region and the magnet of the second region comprises a plurality of magnets arranged as a ring about a perimeter of each of the first and second regions of the torso.

20. The defibrillator training system of claim 15 wherein one of the pair of defibrillator training pads is configured to attach to the first region of the torso only; and
   wherein the other of the pair of defibrillator training pads is configured to attach to the second region of the torso only.

* * * * *